(12) United States Patent
Delker et al.

(10) Patent No.: US 7,990,896 B1
(45) Date of Patent: *Aug. 2, 2011

(54) METHOD AND SYSTEM FOR AUTOMATING NODE CONFIGURATION TO FACILITATE PEER-TO-PEER COMMUNICATION

(75) Inventors: Jason Delker, Olathe, KS (US); John M. Everson, Leawood, KS (US); James Norris, Kansas City, MO (US); Bryce A. Jones, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 821 days.

This patent is subject to a terminal disclaimer.

(21) Appl. No.: 11/777,653

(22) Filed: Jul. 13, 2007

Related U.S. Application Data

(63) Continuation of application No. 10/287,960, filed on Nov. 5, 2002, now Pat. No. 7,263,070.

(51) Int. Cl.
*H04L 12/28* (2006.01)
(52) U.S. Cl. .......................................... 370/255; 709/243
(58) Field of Classification Search ........................ None
See application file for complete search history.

(56) References Cited

U.S. PATENT DOCUMENTS

| | | | |
|---|---|---|---|
| 5,987,011 A * | 11/1999 | Toh ................................ | 370/331 |
| 6,826,406 B1 | 11/2004 | Vialen et al. | |
| 6,845,084 B2 * | 1/2005 | Rangnekar et al. ............ | 370/254 |
| 6,892,230 B1 | 5/2005 | Gu et al. | |
| 7,065,579 B2 | 6/2006 | Traversat et al. | |
| 7,136,927 B2 * | 11/2006 | Traversat et al. ............. | 709/230 |
| 7,272,636 B2 * | 9/2007 | Pabla ............................. | 709/216 |
| 7,353,252 B1 * | 4/2008 | Yang et al. ..................... | 709/204 |
| 2002/0073204 A1 | 6/2002 | Dutta et al. | |
| 2002/0122410 A1 * | 9/2002 | Kulikov et al. ............... | 370/349 |

(Continued)

OTHER PUBLICATIONS

"Wireless Lan Card settings for AdHoc communication," http://www.practicallynetworked.com/support/adhoc_setup.htm, printed from the World Wide Web on Aug. 14, 2002.

(Continued)

*Primary Examiner* — Phirin Sam

(57) ABSTRACT

A method and system for configuring one or more prospective-participant nodes as participant nodes so as to enable the prospective-participant nodes to engage in a peer-to-peer communication is provided. In one exemplary embodiment, the method and system may be embodied as a common application that includes logic, in hardware or software form, for carrying out one or more of the functions for configuring one or more prospective-participant nodes as a participant node in a peer-to-peer network.

In carrying out these functions, one of the participant nodes discovers its network-connection settings, and based on these settings, generates participant-node-configuration data that includes one or more network connection settings that define how to address the prospective-participant node as a participant node.

When desiring to join the peer-to-peer network, the prospective-participant node and the participant node may establish a point-to-point communication link by engaging in a discovery process using so as to establish a data-link layer connection. After completing negotiation of the data-link-layer connection, the prospective-participant node and the participant node may communicate over the data-link-layer connection. The prospective-participant node may send to the participant node a request for network access. Responsively, the participant node sends to the prospective-participant node the participant-node-configuration data over the point-to-point connection. And the prospective-participant node configures itself using the participant-node-configuration data so as to become a participant node.

8 Claims, 5 Drawing Sheets

U.S. PATENT DOCUMENTS

| | | | |
|---|---|---|---|
| 2003/0179742 A1* | 9/2003 | Ogier et al. | 370/351 |
| 2003/0181213 A1* | 9/2003 | Sugar et al. | 455/454 |
| 2004/0064512 A1* | 4/2004 | Arora et al. | 709/206 |
| 2004/0133640 A1* | 7/2004 | Yeager et al. | 709/204 |

OTHER PUBLICATIONS

"Installing TCP/IP," http://www.practicallynetwored.com/sharing/lansetup2.htm, printed from the World Wide Web on Aug. 14, 2002.

"Using DHCP," http://www.practicallynetworked.com/sharing/dhcp.htm, printed from the World Wide Web on Aug. 14, 2002.

"Wireless Encryption Help," http://www.practicallynetworked.com/support/wireless_encrypt.htm, printed from the World Wide Web on Aug. 14, 2002.

"Why two Networks?," http://www.practicallynetworked.com/sharing/twonets.htm, printed from the World Wide Web on Aug. 14, 2002.

"Wireless 101," http://www.compaq.com/products/wireless/wlan/wireless101.html, printed from the World Wide web on Aug. 21, 2002.

* cited by examiner

METHOD AND SYSTEM FOR AUTOMATING NODE CONFIGURATION TO FACILITATE PEER-TO-PEER COMMUNICATION

REFERENCE TO RELATED APPLICATION

This is a continuation of U.S. patent application Ser. No. 10/287,960, filed Nov. 5, 2002, the entirety of which is hereby incorporated by reference.

BACKGROUND

1. Field of the Invention

The present invention relates, in general, to computer networks. More particularly, this invention relates to a method and system for automatically and dynamically configuring one or more prospective participant nodes as participants in a peer-to-peer network to enable to the prospective participant nodes to engage in peer-to-peer communication with other participant nodes. This invention is particularly useful for automatically and dynamically configuring one or more prospective wireless-participant nodes as participants in a peer-to-peer network to enable the prospective wireless-participant nodes to engage in peer-to-peer communication with other participant nodes, wireless or otherwise.

2. Description of Related Art

Local Area Networks (LANs) allow users of the LANs to exchange information between interconnected or communicatively coupled computers, commonly referred to as stations or nodes. LANs beneficially allow the members to exchange files, data, voice traffic and other information. Additionally, LANs permit users of one LAN node to share resources of another LAN node, including other interconnected or communicatively coupled peripheral-type devices, such as printers, cameras, and data storage. Depending on the needs of the user, the architecture, topology, and transmission media of the LANs may vary.

One common type of LAN architecture is the client/server architecture in which each node and/or process on the network is either a client or a server. Servers are generally powerful computers that are dedicated to managing the network resources, and may take a variety of forms such as file servers, print servers, and/or network servers. Clients, on the other hand, run user applications, which may request one or more of the network resources from the one or more servers coupled to the network. For instance, when database mining for some desired information, not only may a client request from a network drive a file that hopefully contains the desired information, but the client may also request that the database server run macros (i.e., special-purpose command language code within the application) to locate a specific value or field in the database.

Another type of LAN architecture is a peer-to-peer or "ad hoc" architecture LAN (peer-to-peer LAN). Distinguishing the architecture of the peer-to-peer LAN from client/server architecture LAN are the rules and responsibilities of each of its nodes. Unlike the hierarchical nature or "master/slave" relationship between the nodes in client/server architecture LAN, each node in a peer-to-peer LAN typically has equivalent responsibilities and generally has the same capabilities. Consequently, peer-to-peer architecture is generally simpler than client/server architecture.

Configuring nodes to engage in peer-to-peer communication in a peer-to-peer LAN, however, can be difficult since there is no node in the peer-to-peer LAN having a central repository of configuration information similar to the configuration information managed by the server and supplied to the client in a client/server architecture LAN. This difficulty may become more evident when large distances separate one node from another and configuration information for the peer-to-peer network cannot be directly communicated between the nodes. Further, given that peer-to-peer networks may be established using wireless and/or wired transmission media, and given that there are many different transmission technologies for these media, managing the configuration information for the different media and transmission technologies becomes even more daunting when the configuration information cannot be directly communicated between the nodes.

As with most types of LANs, a peer-to-peer LAN operates according to one or more established protocols. Generally, in one form or another, each of the protocols defines one or more protocol layers, which collectively define a protocol stack. Each layer of the protocol stack exists to perform a specific function, such as addressing, routing, framing and physical transmission for a communication. During a communication session, portions (e.g., packets) of the communication may be transmitted from a source node (e.g., a first peer-to-peer LAN participant node) to a target node (e.g., a second peer-to-peer LAN participant node) passing downward through layers of the source node's protocol stack, and upward through corresponding layers of the target node's protocol stack.

Each layer of the protocol stack in the transmitting process may provide information to the corresponding layer in a receiving process. Typically, the layers at the top of a protocol stack are designed to provide end-to-end communication between source and destination node. For instance, the top layers may provide packet-sequence information and encryption. Lower layers of the stack generally provide information to facilitate communication between nodes in the network. As an example, the lower layers in the stack may provide network address information for use in routing packets through the network to the appropriate node.

A variety of packet-data communication protocols are known. For instance, there are the Open System Interconnection (OSI) 7 layer model, TCP/IP protocol suite (TCP/IP suite), Novell's SPX/IPX protocol, Apple Computer's Appletalk protocol, Microsoft's NetBEUI protocol, and IEEE 802 family of protocols, to name a few. For purposes of illustration, the communication protocol referenced hereinafter is based the exemplary TCP/IP suite, which is used to manage transmission of packet-data or "packets" throughout the Internet and other IP networks. It is to be understood, however, that other protocols or standards could also be used.

The TCP/IP protocol stack includes, from lowest to highest, a data-link layer, a network or "IP" layer, a transport layer and an application layer. The data-link layer includes protocols and services that apply to network-interface-card drivers that allow a node to connect to the physical network. The IP layer provides addressing information to facilitate independent routing of packets within or between networks. In addition, the IP layer includes control layers.

The transport layer allows source and target nodes to carry on a communication with each other. To facilitate such communication, the transport layer may include a connection-oriented Transmission Control Protocol (TCP) layer and/or a connectionless User Datagram Protocol (UDP) layer. While the UDP layer may not technically belong to the TCP/IP suite, its services are commonly described in conjunction with the TCP layer and TCP/IP suite for convenience. Finally, the application layer includes application programs that carry out the functionality of a node and carry out interfacing with a user.

Generally, to communicate with a target node, the source node, at a minimum, needs to know the address of the target node. In the TCP/IP suite, this address is the Internet Protocol address (IP) address. In an IP network, every node of the network uses a unique IP address, which may be either statically or dynamically assigned. In the client/server architecture, a Dynamic Host Configuration Protocol (DHCP) server running on an enterprise server or router automatically assigns IP addresses to client nodes joining a client/server TCP/IP network, and recovers formerly assigned addresses once a client leaves the network. The DHCP application eliminates manually assigned permanent (i.e., static) IP addresses in the client/server architecture LAN, and it therefore allows the client/server architecture LAN to preserve the number of IP addresses, which are inherently limited.

IP addresses are written as four sets of numbers separated by periods, such as 207.1.2.5. TCP/IP addresses use 32 bits for specifying the IP address. These 32 bits may be made up of a network and host address (commonly referred to a "net_id" and "host_id"). The more bits used for network address, the fewer remain for hosts. Certain high-order bits identify class types (e.g. Class A, B, C, and D) and some numbers are reserved. Because of the explosion in the amount of needed net_ids and host_ids, Class C addresses have been expanded using the Classless Inter-Domain Routing method (CIDR), which uses a variable network ID instead of the fixed numbers in the other classes.

Network addressing may be further expanded using a sub-network (subnet). This is typically done to separate one network from another to improve performance and security. To subdivide the network and create additional addresses, a subnet mask may be used. The subnet mask is used to filter or pass communications to a particular network segment and a particular node. The subnet mask is a binary pattern that is stored in the node. During a communication, the address appended to a packet is compared to the IP address of the node to determine whether to accept or reject the packet.

As noted above, in the TCP/IP suite, the IP-protocol-stack layer provides addressing information to facilitate routing of packets between layers. The IP protocol prepares the packets for the data-link layer by translating the IP addresses into physical station addresses, commonly referred to as MAC addresses or Ethernet addresses. Generally, the IP protocol uses the Address Resolution Protocol (ARP) translation mechanism to obtain the MAC address. Alternatively, the IP protocol may use a predefined configuration file that contains the addresses. Once prepared, the IP protocol supplies to the data link layer one or more datagrams having the MAC address of the target node. After receiving these datagrams, the data-link layer forwards them to the physical layer and then off to the target node.

In the application layer of the TCP/IP suite, a program on one node that desires to communicate with another node does so through a socket. Generally, the socket is a combination of the IP address and the program's port. If the IP address is only known by a server name, the server name may be resolved using a Domain Name System (DNS) server, or in the case of a Windows network using TCP/IP, a Windows Internet Naming System (WINS) server. A port is a logical number assigned to every program. These numbers are assigned to common programs using an agreed upon number known as "well-known ports." In a LAN, the ports assigned to programs are permitted to be arbitrary so long as the well-known ports are not used.

When setting up a LAN, or adding another node to an existing LAN, many of the address parameters are set manually and maintained by a network administrator or some other equivalent. As noted above, the IP address of each node must be unique, otherwise confusion results regarding which node should receive a communication, or more specifically an addressed packet of information. In client/server architecture, the DHCP server may be used to assign and keep track of IP addresses, so that (i) no two nodes have the same address and (ii) incoming packets are directed to the appropriate node. In a peer-to-peer LAN architecture, however, generally no such server exists since each node typically has equivalent responsibilities and generally the same capabilities.

Today, wireless access devices, such as IEEE 802.11 protocol wireless-communication cards (802.11 network interface cards), may be used to connect to a LAN built according to either client/server or peer-to-peer architecture. Many of the 802.11 cards may be operated in one of several various modes. Included among these various modes are an "infrastructure" mode and "ad hoc" or peer-to-peer mode.

In the infrastructure mode, the "802.11-capable node", which may be referred to as a "station" in IEEE 802.11 parlance, communicates with an access point. The access point performs server-type functions including registering (i.e., authenticating and associating) the station with the network. In the peer-to-peer mode, however, such server-type functionality does not exist. Consequently, the peer-to-peer network's configuration information, which contains network configuration parameters for addressing and registering stations joining an established peer-to-peer LAN or creating a peer-to-peer LAN, are generally set and maintained manually.

Therefore, to provide the peer-to-peer network's configuration information to one or more prospective (i.e., not yet configured) nodes, what is needed is a method and system for automatically and dynamically configuring such nodes in an peer-to-peer LAN. Further, what is needed is a method and system that automatically and dynamically configures the nodes in peer-to-peer LAN without exchanging a large number of parameters, and which can be accomplished in a secure manner, if desired.

SUMMARY

One embodiment of the present invention is directed to a method and system for configuring or "setting up" a prospective-participant node as a participant node in a peer-to-peer network, to enable the prospective-participant node to engage in a peer-to-peer communication in the peer-to-peer network with other participant nodes. As used herein, a "participant node" is a node that is already configured to engage in peer-to-peer communication with one or more other nodes in a peer-to-peer network, while a "prospective participant node" is a node that is not yet configured to engage in peer-to-peer communication in the network. To facilitate the setting up of the prospective-participant node as a participant node in the peer-to-peer network, each of the participant nodes is configured with one or more respective network connection settings, which define how to address the participant node in the peer-to-peer network.

To set up the prospective-participant node as a participant node, a first one of the participant nodes discovers or otherwise determines its network-connection settings. And based these network-connection settings, the first participant node generates or otherwise creates participant-node-configuration data. Preferably, the participant-node-configuration data includes one or more network connection settings that define how to address the prospective-participant node as a participant node in the peer-to-peer network. Once created, the first participant node may store the participant-node-configuration data in a database or other repository, which may be used by the other participant nodes as a membership table.

When the prospective-participant node desires to join the peer-to-peer network (or to create a peer-to-peer network when the first participant node is the only existing participant node), the prospective-participant node and the first participant node begin by establishing a point-to-point communication link with each other. To establish the point-to-point communication link, the prospective-participant node and the participant node may engage in a discovery process to establish a data-link layer connection.

To facilitate the discovery process, each of the participant nodes is preferably configured with a network identifier, such as a Network Name (or Service Set Identifier (SSID) in IEEE 802.11 jargon). And the first participant node can advertise (e.g., broadcast, multicast and unicast) this network identifier to the prospective-participant node, in order to let the prospective-participant node know the identity of the network. In this regard, the prospective-participant node and each existing participant node are configured with secure-connection-service mechanisms, such as paired-cryptographic keys. Accordingly, during the discovery process, the first participant node may advertise the network identifier in encrypted form such that only a prospective-participant node having the appropriate key may detect the presence of the peer-to peer network, thus screening out unwanted prospective-participant nodes.

In addition, as part of the discovery process, the prospective-participant node may also detect the presence of the network identifier and responsively negotiate data-link-layer-connection parameters with the first participant node. After completing this negotiation, the prospective-participant node and the first participant node may communicate with each other over the data-link-layer connection.

After establishing the point-to-point communication link, the prospective-participant node may send to the first participant node a request for network access. This request may be sent over the data-link-layer connection. To facilitate sending the request over the data-link-layer connection, the prospective-participant node may be configured with a network interface unit that has a node identifier. The node identifier, for instance, may be a unique medium-access-control address assigned to or otherwise configured on the network interface unit, or it could be a name assigned to or otherwise associated with the network interface unit. When sending the request for network access over the data-link-layer connection to the first participant node, the prospective-participant node may include in the request the network identifier, which the first participant node can use as a basis to identify the prospective-participant node and to determine if any network services are available for the prospective-participant node.

When receiving the request for network access, the first participant node, using the node identifier, makes a determination of whether any network services are available for the prospective-participant node. To facilitate making the determination, the first participant node may be configured with a respective user interface. Sometime after the participant node receives the request for network access, a "pop-up window" or other display screen is displayed on the user interface. And contained within the pop-up window is an indication of the request for network access. For instance, if the node identifier of the prospective-participant's node is "John's Computer," the pop-up window on the first participant node might state, "This is John's Computer, may I join your peer-to-peer network?"

To determine if any network services are available for the prospective-participant node, the first participant node may receive, via its user interface, a user input indicating whether to allow the prospective-participant node to receive network services. In any event, if the first participant node determines that network services are available for the prospective-participant node, then the first participant node sends the participant-node-configuration data over the point-to-point connection to the prospective participant node.

After receiving the participant-node-configuration data over the point-to-point connection from the first participant node, the prospective-participant node configures itself using the participant-node-configuration data, so as to become a participant node. In order to configure itself, the prospective-participant node may have one or more configurable network-connection settings. These configurable network-configuration settings, which are similar the network connection settings of the one or more other participant nodes, may be configured so as to define how other participant nodes can address the prospective-participant node as a participant in the peer-to-peer network. In the exemplary embodiment, by using the network-configuration settings extracted from the participant-node-configuration data, the prospective-participant node may configure its own respective network configuration settings.

Once configured, the prospective-participant node thus becomes a participant node having the network connection settings defined by its respective participant-node-configuration data. Thus, other participant nodes may then engage in peer-to-peer communications with the prospective-participant node (now a participant node) using these configured network-connection settings.

Another embodiment of the present invention is directed to a method and system for configuring two or more prospective-participant nodes to enable the prospective participant nodes to engage in peer-to-peer communication as participant nodes in a peer-to-peer network. Each of the prospective-participant nodes is configurable with one or more respective network-connection settings that define how to address the prospective-participant node regardless of network affiliation. These network-connection settings may have default settings or may have previously configured settings.

To configure the prospective-participant nodes, one of the prospective-participant nodes may be designated as a host node and another of the prospective-participant nodes may be designated as a guest node. Such designation may be carried out in various ways, including, by way of example, receiving user input on respective user interfaces associated with each of the prospective-participant nodes.

Since each of the prospective-participant nodes may have default or previously configured network-connection settings, the network-connection settings previously configured in the host node may be used to define how to address the host node as one of the participant nodes in the peer-to-peer network. The network-connection settings of the host node may be ascertained using a network-connection-discovery process.

After designation, the host node, using its respective network-connection settings as service settings, may generate participant-node-configuration data that defines how to address the guest node as the second of the participant nodes in the peer-to-peer network. Consequently, the participant-node-configuration data may be used for configuring the guest node as a second of the participant nodes.

At some point, the host node and the guest node establish a point-to-point (i.e. a direct connection) communication link. While such point-to-point communication link may be established without secure-connection services, the host node and the guest node preferably employs secure-connection services, such as secure-socket-layer encryption or any other security mechanism, so as to prevent unwanted prospective-participant nodes from participating in the peer-to peer network.

To establish a point-to-point communication link in a secure manner, the host and the guest node may have secure-connection-service mechanisms, such as paired-cryptographic keys. And the host node may be configured with a network identifier, which the host node can advertise in encrypted form using its cryptographic key, so as to inform the guest node of the identity of the network. When the host node advertises the encrypted network identifier, the guest node may detect and decrypt the identifier and thus the existence of the peer-to peer network. And in response to the network identifier, the guest node and host node may engage in a discovery process to establish a mutual data-link layer connection. In particular, in response to the network identifier, the guest node and host node may negotiate data-link-layer-connection parameters, preferably with use of secure connection services.

Alternatively, to establish a point-to-point communication link in a non-secure manner, the host node may advertise the plaintext network identifier, and the guest node may detect that plaintext identifier. And in turn, the host node and the guest node may similarly engage in a discovery process to establish a mutual data-link-layer connection, negotiating data-link-layer connection parameters.

Once the guest node and host node have finished negotiating data-link-layer connection parameters, the guest node and the host node may then communicate with each other over their established data-link-layer connection. After the host and guest node establish the point-to-point connection link, the guest node sends a request for network access over the link to the host node. Preferably, the guest node sends the request at the data-link-layer level. To facilitate this, the prospective-participant node may be configured with a network interface unit, which has a node identifier.

The node identifier, for instance, may be a unique medium-access-control address assigned to or otherwise configured on the network interface or a name assigned to or otherwise associated with the network interface. When sending the request for network access over the data-link-layer connection to the host node, the guest node may include in the request the node identifier, in order to let the host node know which node is requesting access to the peer-to-peer network.

Upon receipt of the guest node's request for network access, the host node may extract the node identifier from the request and make a determination of whether any network services are available to the guest node. Similar to the embodiment described above, for instance, to facilitate making the determination, the host node may be configured with a respective user interface. In that case, upon receipt of the request for network access, the host node may programmatically present a "pop-up window" or other display on the user interface. And the pop-up window may indicate the request for network access.

To make the determination, the host node may then similarly receive user input indicating whether to allow the guest node to receive network services. And if the determination is to grant network access, then the host node sends the participant-node-configuration data over the point-to-point connection to the guest node.

After the guest node receives the participant-node-configuration data, the guest node may then use the participant-node configuration data to configure its respective network-configuration settings, so as to become a participant node. In particular, the guest node may configure one or more of its network-connection settings using the network-configuration settings contained within the participant-node-configuration data. Once configured, the guest node may then engage in peer-to-peer communication with the host node using these configured network-connection settings.

Yet another embodiment of the present invention is directed to a method and system for setting up a prospective-participant node as a participant node in a peer-to-peer network, to enable the prospective-participant node to engage in peer-to-peer communication with one or more other participant nodes in the peer-to-peer network. In the exemplary system, the prospective-participant node and each of the other participant nodes each include at least one processor and data storage. And each of the other participant nodes is configured with one or more respective network-connection setting defining how to address the participant node in the peer-to-peer network.

In addition, the system includes a common application stored on the data storage of the prospective-participant node and on the data storage of each of the other participant nodes. And the application is executable by the at least one processor of each respective node to facilitate configuring the prospective-participant node as a participant node. For instance, a participant node designated as a host node might execute the application to establish a point-to-point communication connection with the prospective-participant node and to send participant-node-configuration data (e.g., network-connection settings) to the prospective-participant node. Further, the prospective-participant node might execute the application to use the respective network-connection settings of one of the other participant nodes as a service setting so as to generate participant-node-configuration data, and to use that participant-node-configuration data to configure itself as a participant node in the peer-to-peer network. (As indicated above, the participant-node-configuration data would preferably contain one or more network-connection settings that defines how to address the prospective-participant node as a participant node in the peer-to-peer network.)

These as well as other aspects and advantages will become apparent to those of ordinary skill in the art by reading the following detailed description with appropriate reference to the accompanying drawings.

BRIEF DESCRIPTION OF THE DRAWINGS

Presently preferred embodiments of the invention are described below in conjunction with the appended figures, wherein like reference numerals refer to like elements in the various figures, and wherein.

DETAILED DESCRIPTION OF EXEMPLARY EMBODIMENTS

I. Exemplary Architecture

Various exemplary architectures may be used for deploying an exemplary embodiment of the present invention for configuring or "setting up" a prospective-participant node as a participant node in a peer-to-peer network. These various architectures enable the prospective-participant node to engage in a peer-to-peer communication in the peer-to-peer network with other participant nodes. Likewise, the same or other assorted exemplary architectures may be used for carrying out another exemplary embodiment. In this other exemplary embodiment, the assorted architectures provide the structure to configure a plurality of prospective-participant nodes to enable each of the prospective-participant nodes to engage in peer-to-peer communication as a participant node in a peer-to-peer network.

Figure 1:
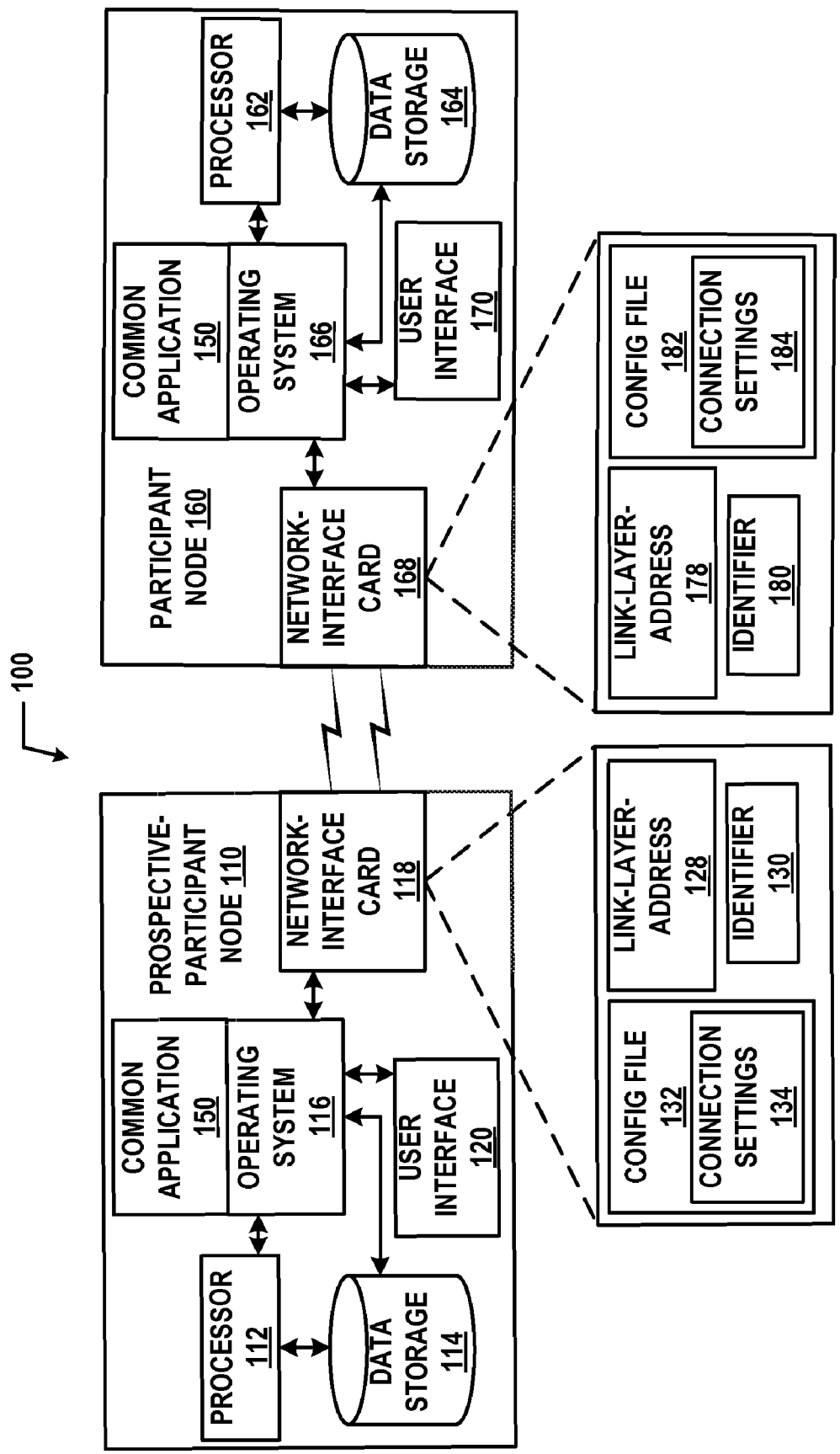
FIG. 1 illustrates an exemplary architecture of a peer-to-peer network in accordance with one of the various exemplary embodiments.

FIG. 1 illustrates an exemplary architecture of a peer-to-peer network 100 in accordance with one of the various exemplary embodiments. The exemplary architecture of the peer-to-peer network 100, which includes a prospective-participant node 110 and a participant node 160 (i.e. a node already configured as a participant node), may be used to set up of otherwise configure the prospective-participant node 110 as a participant node in a peer-to-peer network. Configuring the prospective-participant node 110 enables the prospective-participant node to engage in a peer-to-peer communication in the peer-to-peer network with other participant nodes, such as participant node 160.

While FIG. 1 shows only one prospective-participant node, namely prospective-participant node 110, the peer-to-peer network 100 may include more than one prospective-participant node desiring to become a participant node in the peer-to-peer network. And while FIG. 1 illustrates only one participant node, namely participant node 160, the peer-to-peer network 100 may have more than one participant node. By having more than one participant node, the prospective-participant node 110, after being configured as a participant node, may be able to beneficially communicate (e.g., exchange data and share resources) with not only the participant node 160, but with the other participant nodes as well.

Although their architectures may differ, the prospective-participant node 110 and the participant node 160 may have substantially similar configurations because each node in a peer-to-peer network often has the same capabilities. In either case, the prospective-participant node 110 and a participant node 160 each include a respective processor 112, 162, and a respective data-storage 114, 164, both of which may be managed by a respective operating system 116, 166.

A. Computing Platform

The processors 112, 162 may take various forms. For instance, each of the processors 112 and 162 may be a processing part of a computer and/or a standalone personal computer (PC) or multiple computers coupled together. Like the processors 112, 162, the data-storage 114, 164 may take many forms. In one format, the data-storage 114, 164 may be embodied as one or more digital-storage devices that are preferably integral to or integrated with the processor 112, 162. In this arrangement, the data-storage 114, 164 and the processor 112, 162 are communicatively coupled to each other, thereby allowing the data-storage 114, 164 and the processor 112, 162 to exchange data.

In an alternate format, the data-storage 114, 164 may be embodied as one or more stand-alone digital-storage devices, which are external, or otherwise separate from the processor 112, 162. These stand-alone devices, like the internal devices, may be communicatively coupled with the processor 112, 162 using an external link, such as an Ethernet.

The data-storage 114, 164, whether integral to, integrated into, and/or external to the processor 112, 162, may comprise hard-drives, volatile and non-volatile memory, tape drives, optical media, and any other storage media capable of storing digital information. In combination, the processor 112, 162, and data-storage 114, 164 may provide a computing platform on which to store and run the operating system 116, 166 and application layer programs (hereinafter referred to as "applications").

Generally, the computing platforms provided by the processors 112, 162 and data-storage 114, 164 are managed by operating systems 116, 166, such as IBM AIX, UNIX, Linux, Microsoft Windows, and/or any other operating system. Each operating system 116, 166 may provide not only basic input and output functions, but also enhanced features and functions, such as data compression, to control the flow of data between the processor 112, 162 and data-storage 114, 164. Further, the operating system 116, 166 generally includes a file management system for storing and retrieving files on the data-storage 112, 162. Managing the interactions between the processors and the data storage, and controlling the processing of data and program instructions for the processors 112, 162 and data-storage 114, 164, the operating system 116, 166 thereby controls how applications operate.

B. Network Interface

Both the prospective-participant node 110 and a participant node 160 may also include a network interface, such as network-interface cards 118, 168, respectively. In practice, the network interface cards 118, 168 control the exchange of data between the nodes at the data-link-layer level. As noted above, the data-link-layer provides the link that allows the prospective-participant node 110 and the participant node 160 to connect to the physical network, and thus, to each other and/or other participant nodes. To do so, these network interface cards 118, 168 may have network-interface-card drivers ("network drivers") that employ data-link layer protocols and services that allow the prospective-participant node 110 and a participant node 160 to connect to the physical network, and thus to each other and or other participant nodes.

To facilitate interconnectivity, the network drivers may use statically configured and/or dynamically configurable data-link-layer or physical-station addresses, such as MAC addresses. And these data-link-layer or physical-station addresses, i.e., prospective-node-link-layer-address 128 and participant-node-link-layer-address 178, may be statically or dynamically configured into the network interface cards 118 and 168, respectively.

In addition to the data-link-layer addresses, each of the network interface cards 118, 168 may have one or more statically configured or dynamically configurable node identifiers, namely prospective-participant-node identifier 130 and participant-node identifier 180. These node identifiers may reside in the data-link-layer level of the protocol stack so as to provide an additional indication of the network interfaces that are attached to the respective nodes. The prospective-participant-node identifier 130 and participant-node identifier 180, for example, may each be an ASCII representation of a name given to the attached node, such as "John's Computer," and "Network Node 1," respectively. The prospective-participant-node identifier 130 and participant-node identifier 180 may take other forms as well, and the network interface cards 118, 168 need not employ node identifiers.

Interfacing the network drivers are network interface drivers that reside in the network or IP layer. The network interface drivers provide an interface between the transport protocol, e.g., the TCP or UCP protocol, and the data link protocol. As known in the art, the network-interface drivers provide a protocol manager that accepts requests from the transport layer and activates the network-interface card. Examples of exemplary network interface drivers are Novell's ODI and Microsoft's NDIS.

To function, these network-interface drivers need network layer information. Such information may be included in a network-configuration file. Accordingly, both the prospective-participant node 110 and a participant node 160 may have respective network-configuration files, i.e., prospective-participant-config file 132 and participant-config file 182. The participant-config file 182 may have one or more configurable network-connection settings, referred to hereinafter as "participant-node-connection settings" 184. These configurable participant-node-connection settings 184 may be configured so as to define how to address the participant node 160 in the peer-to-peer network.

The prospective-participant-config file 132 may also contain one or more configurable network-connection settings, hereinafter referred to as "prospective-node-connection settings" 134. Paralleling the participant-node-connection settings 184, the prospective-node-connection settings 134 may be configured to define how to address the prospective-participant node 110 as a participant node in the peer-to-peer network.

The respective network-configuration settings for both the prospective-participant node 110 and the participant node 160 may include a unique network-layer address, such as an IP address, a subnet mask, a default gateway setting, and/or other network connection settings. When accepting data from the transport layer, the protocol manager of the network-interface driver translates the data using the network-connection settings and sends it to the data-link layer for proper delivery.

C. User Interface

The prospective-participant node 110 and a participant node 160 may also have respective user interfaces 120, 170, which assist users in interacting with the respective nodes, and in turn to other nodes using, of course, the protocol stack. Each of the user interfaces 120, 170 may have a display for displaying a combination of (i) indications, such as the node identifiers, (ii) other information ported to the application level as well as (iii) application level information. The user interfaces 120, 170 may include input and output (I/O) devices, such as (i) keyboards, (ii) mice, (iii) pointing and tap styluses, (iv) touch screens and (v) other I/O devices for receiving information from respective users. Other elements may compose the user interfaces 120, 170 as well.

In sum, exemplary configurations of the prospective-participant node 110 and a participant node 160 may include devices having network interfaces cards for network connectivity such as desktop and laptop personal computers, personal digital assistants (PDAs), and/or wireless and cellular telephones. The prospective-participant node 110 and a participant node 160 may take other forms as well.

D. Common Application

In addition to the operating system, prospective-participant node 110 and a participant node 160 each have other applications, such as common application 150, stored on their respective data storage and executable by their respective processors. As will be described in more detail below, the common application 150 includes logic, in hardware or software form, for carrying out one or more of the functions for (i) for configuring a prospective-participant node 110 as a participant node in a peer-to-peer network, and/or (ii) configuring two or more prospective-participant nodes to enable the prospective participant nodes to engage in peer-to-peer communication.

2. Configuring a Prospective-Participant Node as a Participant Node

Figure 2:
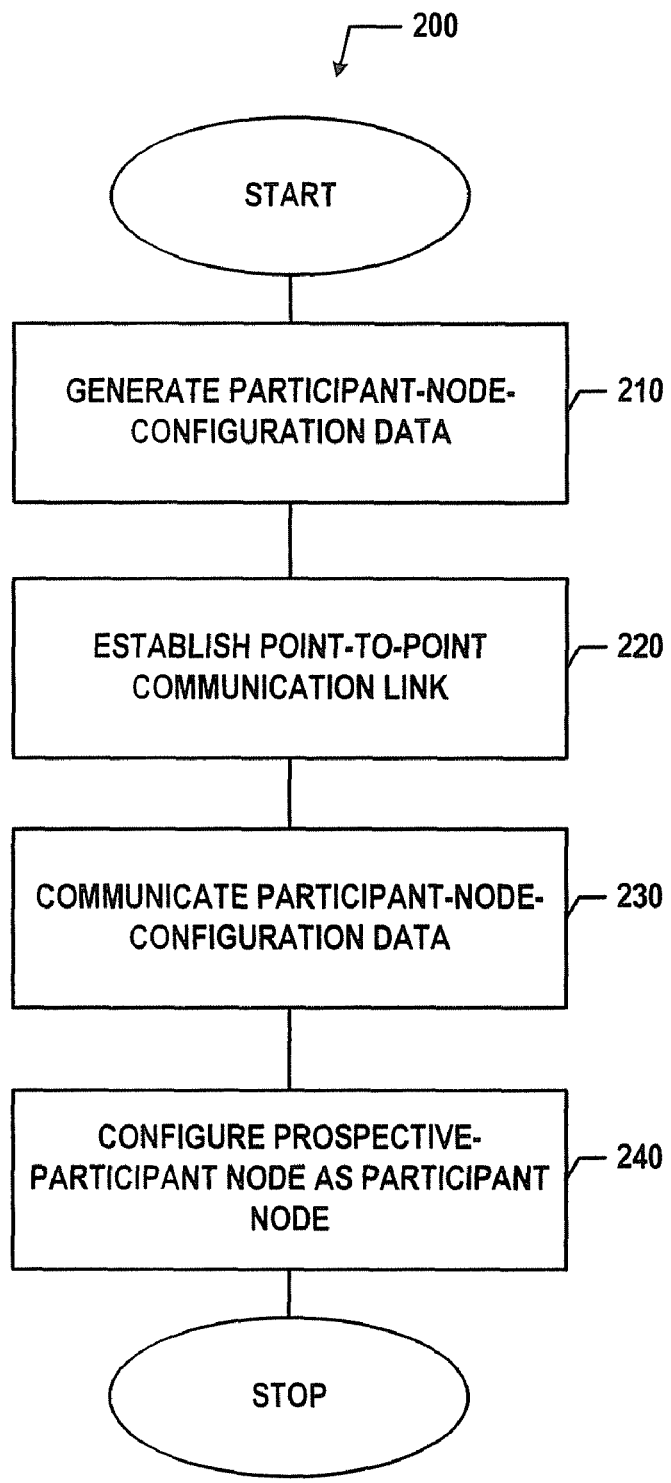
FIG. 2 is a flow chart illustrating the functions used to accomplish configuring a prospective-participant node as a participant node in a peer-to-peer network in accordance with one of the exemplary embodiments.

FIG. 2 is a flow chart 200 illustrating the functions used to accomplish configuring the prospective-participant node 110 as a participant node in a peer-to-peer network in accordance with an exemplary embodiment. The exemplary embodiment illustrated in FIG. 2 is described with reference to FIG. 1 in which the common application 150 performs such functions. It is understood, however, that such description is for exemplary purposes only and that such functions may be carried out using different architecture.

Referring to FIG. 2, the functions for configuring the prospective-participant node 110 as a participant node in a peer-to-peer network include (i) generating participant-node-configuration data 210, (ii) establishing a point-to-point communication link 220, (iii) communicating the participant-node-configuration data 230, and (iv) configuring prospective-participant node as a participant node 240.

A. Generating Participant Node Configuration Data

Included among the functions of the common application 150 that may be carried out by the processors 112, 162 is the function of using one or more of the respective network-connection settings of the participant node as service settings when generating participant-node-configuration data 160. This participant-node-configuration data includes one or more of the network-connection settings that define how to address the prospective-participant node 110 as a participant node in the peer-to-peer network. By using the participant-node-connection settings 184 of the participant node 160 as the service settings for the participant-node-configuration data, the network-connection settings included in the participant-node-configuration data will be based on the network-configuration settings of the participant node 160. (Note that the participant-node-connection settings 184 of the participant node 160 may have been previously configured.)

For example, the participant-node-connection settings 184 may include a network identifier, a default or previously configured IP address setting, a default or previously configured subnet mask setting, a default or previously configured network gateway setting, and/or other connection settings. For the participant node 160 to engage in peer-to-peer communication with the prospective-participant node 110, the IP address of the participant node must be a different IP address than the IP address of prospective-participant node 110 as well as any other participant node. To ensure that this occurs, the participant node 160 may generate one or more network or subnetwork connection settings. Therefore, if the IP address of the participant node 160 is a class C network address, then the IP address in the participant-node-configuration data may have the same 8-bit host_id as the participant node 160, but the participant-node-configuration data will have different 24-bit net_id.

On the other hand, other network configuration settings in the participant-node-configuration data may have the same or substantially similar settings as the participant-node-connection settings 184. For example, the subnet mask in the participant-node-configuration data may be the same as the subnet mask in participant-node-connection settings 184.

Thus, the participant-node-configuration data contains unique network connection settings when the network-connection settings for participant nodes need to be unique, and participant-node-configuration data contains common network connection settings where the network-connection settings for participant nodes to need to be the same.

B. Establishing a Point-to-Point Communication Link

Another function of the common application 150 that may be carried out by the processors 112, 162 is the function is establishing a point-to-point communication link 220 between at least one of the other participant nodes and the prospective-participant node 110. To accomplish establishing the point-to-point communication link, the common application 150 includes discovery-process logic in which the prospective-participant node 110 establishes a data-link-layer connection with the participant node 160, and/or another participant node.

To facilitate the data-link layer connection, the common application 150 provides an advertising function, which allows the participant node 160 or any other participant node to advertise the existence of the peer-to-peer network 100 so that the prospective-participant node 110 can detect its presence. When advertising the existence of the network, the participant node 160 (or other participant node) may use a network identifier. The network identifier may be any identifier, arbitrarily selected or rigidly assigned, that threads each of the participant nodes to the peer-to-peer network. The network identifier may be, for example, an arbitrary network name, such as "the DENJ Network" and/or, in IEEE 802.11 vernacular, an independent service set identifier (ISSID). The network identifier may take various other forms as well.

To perform the advertising function, the participant node 160 (or any other participant node) may broadcast, multicast or unicast the network identifier and other data-link-layer parameters, such as the participant-node-link-layer-address 128, to the prospective-participant node 110 over a particular channel provisioned into both nodes by the common application 150. As such, the prospective-participant node 110 may detect the network identifier and other data-link-layer parameters when listening on the provisioned channel.

Alternatively, to carry out the advertising function, the participant node 160 (or any other participant node) may broadcast, multicast or unicast the network identifier and/or other data-link-layer parameters to the prospective-participant node 110 over a particular channel provisioned into only the participant nodes. In this case, the common application 150 may contain a routine that enables the prospective-participant node 110 to scan a plurality of channels in an attempt to detect the network identifier and other data-link-layer parameters.

To provide secure and/or "secret" peer-to-peer communication, the function of establishing a point-to-point communication link may be preformed using secure connection system mechanisms. These secure connection system mechanisms may be in accord with one or more secure connection protocols, such as such as secure socket layer (SSL), security system (SSID), extensible authentication protocol (EAP) for wired networks, wired-equivalent privacy (WEP) for wireless peer-to-peer networks, Internet Protocol Security (IPSEC), Layer 2 Tunneling Protocol (L2TP), Transport Layer Security (TLS), and others.

For instance, when advertising the network identifier and other data-link-layer parameters, the participant node 160 may encrypt this information using one key of a shared-key encryption mechanism provided by the secure connection system mechanisms before advertising it to the prospective-participant node 110. With the other key of the shared-key encryption mechanism provisioned into the prospective-participant node 110, only the prospective-participant node 110 may detect the advertised information. This prevents other, uninvited nodes from detecting the advertised network identifier and other data-link-layer parameters when the uninvited nodes happen to be listening on the particular channel on which the participant node 160 advertising such information.

Using the secure connection system when establishing the point-to-point communication link is particularly useful when the participant node 160 and the prospective-participant node 110 desire to carry on peer-to-peer communication at a location, e.g., a crowded seminar where other peer-to-peer communications are taking place as well. If only the participant node 160 and the prospective-participant node 110 are provisioned with the keys for encrypting/decrypting the network identifier, then other undesired prospective-participant nodes without the proper key will not detect the advertisement, and world at most likely consider the broadcast, multicast or unicast to be noise.

In another instance, the participant node 160 may advertise the network identifier and other data-link-layer parameters to the prospective-participant node 110 unencrypted. After detecting the network identifier and other data-link-layer parameters, the prospective-participant node 110, provisioned with keys of a shared-key security mechanism, sends an acknowledgement and one key of the shared-key encryption mechanism to the participant node 160. The participant node 160 then uses this key in completing the negotiation of the data-link-layer connection with the prospective-participant node 110.

C. Communicating Participant-Node-Configuration Data

Yet another function of the common application 150 that may be carried out by the processors 112, 162 is the function of communicating participant-node-configuration data 230. Included in this function is the process of establishing network access, which may be carried out over the point-to-point communication link.

The process of establishing network access may be distributed between the participant node 160 and the prospective-participant node 110. The prospective-participant node 110 sends a request for network access over the point-to-point communication link. In an exemplary embodiment, the request for network access may be sent over the data-link-layer connection. Included in this request is the prospective-participant-node identifier 130 with which the participant node 160 determines if any network services are available to the prospective-participant node 110.

The participant node 160 may determine if any network services are available to the prospective-participant node 110 in various ways. For instance, participant node 160, via its user interface 170, may display to the user of participant node 160 an indication that contains the node identifier of the prospective participant node 110. Such indication may be posed as a query, stating for example, "This is John's Computer, may I join your network?"

In addition to displaying the indication, the participant node 160 (via the common application 150) is configured to receive user input, for instance, a "Yes/No" keystroke, to acknowledge that network services are or are not available to the prospective-participant node 110. Alternatively, the participant node 160 (via the common application 150) may be configured to accept all requests for network access, accept only request from specific computers, and/or accept requests based on some other decision mechanisms.

After determining that network services are available, the participant node 160 may acknowledge that the network services are available by sending the participant-node-configuration data over the point-to-point communication link to the prospective-participant node 110. If, on the other hand, no network services are available, the participant node 160 may send to the prospective-participant node 110 over the point-to-point communication link an acknowledgement, which contains an indication that denies network access.

While listening for a response to its request for network access, the prospective-participant node 110 may receive over the point-to-point connection the acknowledgment with the participant-node-configuration data or the indication denying network access. After receiving the participant-node-configuration data, the prospective-participant node 110 may then configure itself as a participant node on the peer-to-peer network.

D. Configuring the Prospective-Participant Node as a Participant Node

The function of configuring the prospective-participant node 110 as a participant node may be carried by the common application 150 when executed by the processors 112, 162. As noted at block 240 in FIG. 2, the prospective-participant node 110 may configure itself using the participant-node configuration data, in order to become a participant node.

When configuring itself, the prospective-participant node 110 extracts the network-connection settings from the participant-node-configuration data. Using these network-configuration settings, the prospective participant node 110 then configures its configurable prospective-node-connection settings 134. For example, assume that the network-configuration settings from the participant-node-configuration data contains an class C IP address xxx.xxx.xxx.xxx, and a subnet mask of 255.255.255.1. With this information, the prospective-participant node sets its IP address to the class C IP address xxx.xxx.xxx.xxx, and subnet mask value to 255.255.255.1.

Once the prospective-participant node 110 configures its configurable prospective-node-connection settings 134 with the settings from the participant-node-configuration data, the prospective-participant node 110 network connection settings are the settings for a participant node of the peer-to-peer network. This enables the prospective-participant node 110 (now a participant node in the peer-to-peer network) to engage in peer-to-peer communications with other participant nodes in the peer-to-peer network.

The previous embodiments have been described with respect to the prospective-participant node 110, participant node 160 and common application 150. Other embodiments can also be practiced with two prospective-participant nodes and common application 150, understanding, however, that common application 150 may include more or less functions when compared with the functions previously described.

Figure 3:
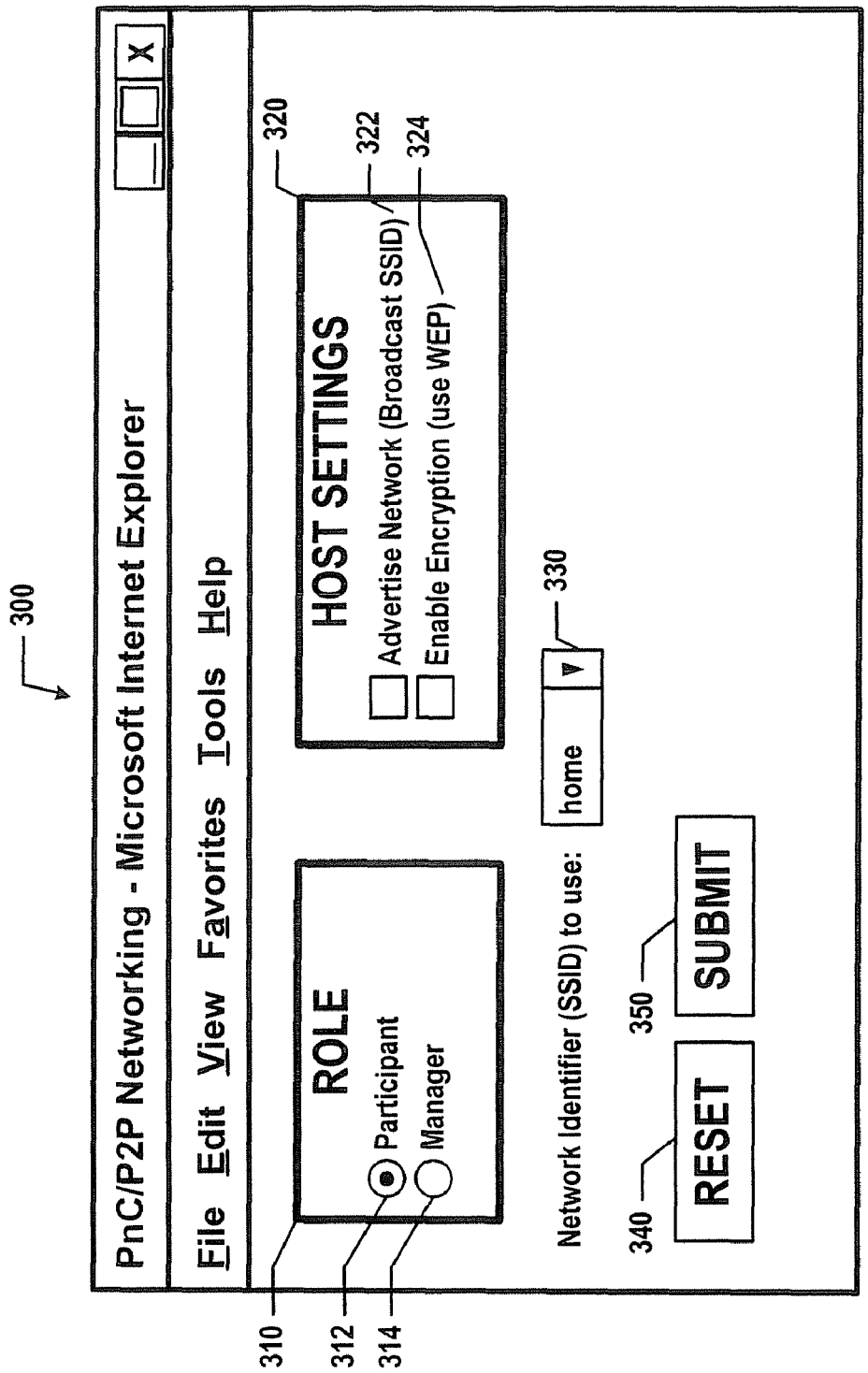
FIG. 3 is a display screen illustrating a user-dialog portion of a common application for configuring the prospective-participant node as a participant node in a peer-to-peer network in accordance with one of the exemplary embodiments.

3. Configuring a Plurality of Prospective Participant Nodes as Participant Nodes FIG. 3 is a display screen illustrating an exemplary user-dialog portion 300 of the common application 150. While the screen is shown in a Microsoft Internet Explorer® window, user-dialog portion 300 may be sent to a different application display window or its own application display window. And while the functions carried out by the common application 150 may apply to both wired and wireless peer-to-peer networking, the following is described with reference to prospective-participant nodes for communicating in an IEEE 802.11 peer-to-peer or ad-hoc network. As noted above, however, the common application 150 is not limited to such prospective-participant nodes and may be used on participant nodes as well as prospective-participant nodes With reference to FIG. 3, the user dialog portion 300 of the common application 150 on each prospective-participant nodes includes a prospective-participant node role part 310, a host node setting part 320, a network-identifier-selection box 330, a reset selection box 340, and a submit selection box 350. Included within the prospective-participant node role part 310 are two labeled radio buttons. The first of the two labeled radio buttons is a guest node radio button 312 for selecting one of the prospective-participant nodes as a guest node. The second of two labeled radio buttons is a host node radio button 314 for selecting one or more of the prospective-participant nodes as a host node.

The host node setting part 320 includes two labeled check boxes for configuring two host node functions to enable the prospective-participant nodes to engage in peer-to-peer communications as participant nodes in the peer-to-peer network. The first of the two-labeled check boxes is an advertise-network-identifier box 322. And the second of the two check boxes is an enable-encryption box 324. The network-identifier-selection box 330 is drop down box for selecting the value of the network identifier, which in an IEEE 802.11, as noted above, may be a randomly generated or an arbitrarily selected SSID.

The reset selection box 340 is a virtual button that, when depressed, resets already selected and designated selections of the dialog portion of the common application 150. Contrary to the function performed when depressing the reset selection box 340, when depressing the virtual button designated as the submit selection box 350, the processors of the prospective-participant nodes on which the common application 150 is executing performs functions for configuring two or more prospective-participant nodes to enable the prospective participant nodes to engage in peer-to-peer communication. It should be noted that each of the selectable parts of the user-dialog portion 300 may be programmed as "sticky" settings. In other words, the last setting used will be the default settings the next time used unless later changed by a user.

Figure 4:
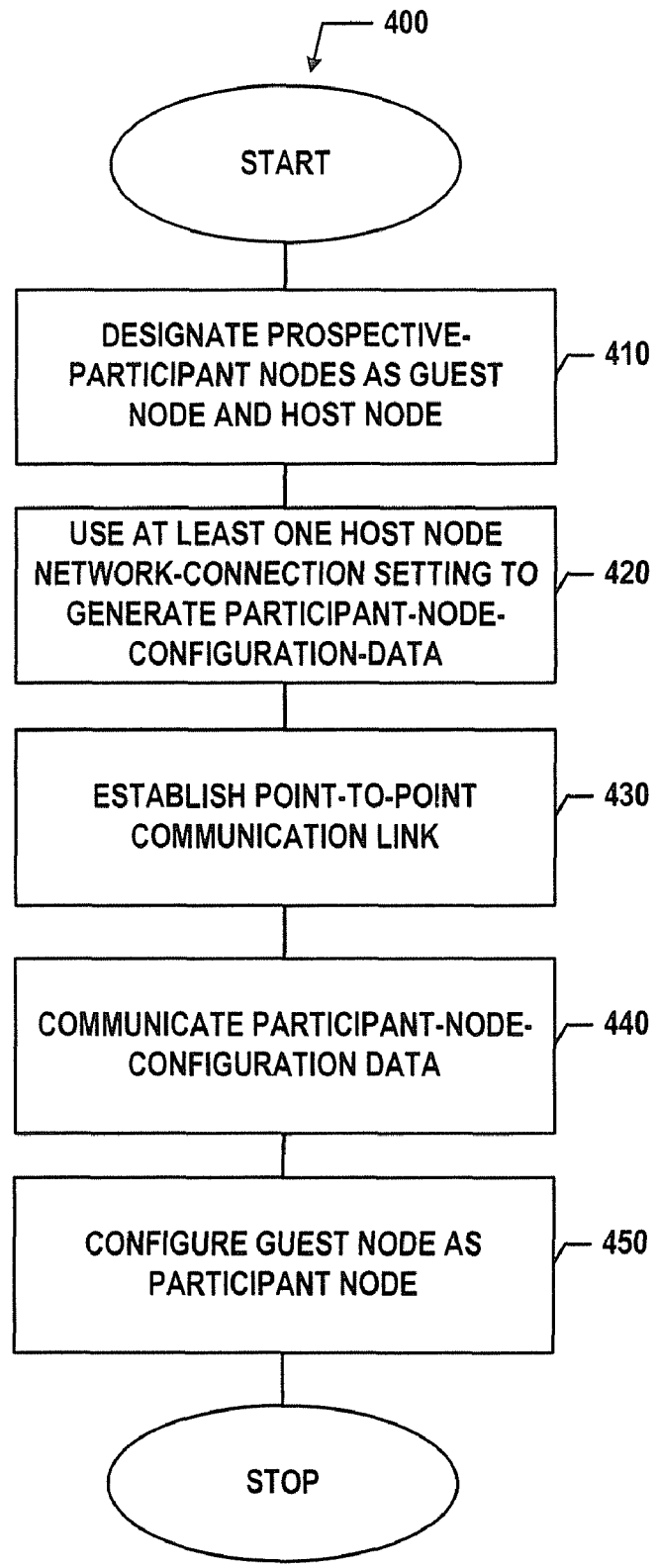
FIG. 4 is a flow diagram for illustrating exemplary functions for configuring two or more prospective-participant nodes to enable the prospective participant nodes to engage in peer-to-peer communication in accordance with one of the exemplary embodiments.

Referring now to FIG. 4, a flow diagram 400 is provided to illustrate exemplary functions for configuring two or more prospective-participant nodes to enable the prospective participant nodes to engage in peer-to-peer communication in accordance with an exemplary embodiment. The flow diagram 400 of FIG. 4 is similar to the flow diagram 200 of FIG. 2, except as described herein.

The flow diagram 400 is described with reference to the user-dialog portion 300 of the common application 150 illustrated in FIG. 3 and the exemplary architecture of a peer-to-peer network 100 illustrated in FIG. 1. Assume, however, that participant node 160 and its elements are not yet configured as a participant node, but rather as a second prospective-participant node (hereinafter referred to as a "second-prospective-participant node" 160). Each of the elements of the second-prospective-participant node 160 will be referred to as above with an appended prefix. For simplicity, the prospective-participant node 110 will hereinafter be referred to as first-prospective-participant node 110 with its elements having a likewise added prefix.

The flow diagram 400 includes the functions of (i) designating one of the prospective-participant nodes as guest node and another of the prospective participant nodes as a host node as shown in block 410; (ii) using at least one network connection settings of the host node so as to generate participant-node-configuration data as shown in block 420; (iii) establishing a point-to-point communication link as shown in block 430; (iv) communicating the participant node configuration data as shown in block 440; and (v) configuring the guest node as a participant node as shown in block 450.

A. Designating Prospective-Participant Nodes as Guest and Host Nodes

Designating one of the prospective-participant nodes as guest node and another of the prospective participant nodes as a host node as shown in block 410 may be performed using at least two approaches. The first of these approaches revolves around a user using the user-dialog portion 300 of the common application 150. In this approach, a user of each of the prospective-participant nodes simply selects the guest-node-radio button 312 or the host-node-radio button 314, using their respective user interfaces, e.g., user interface 120, keeping in mind that only one of the prospective-participant nodes may be the host node.

By way of example, a user of the first-prospective-participant node 110 selects the guest-radio button 312 on the user-dialog portion 300 using its user interface 120. And a user of the second-prospective-participant node 160 selects the host-radio button 314 on the user-dialog portion 300 using its user interface 170.

In a second of the approaches, the user-dialog portion 300 might not include a prospective-participant node role part 310, but even if it does and the user designates the prospective-participant nodes as above, the host node and guest node designation may be designated without user interaction. Since the common application 150 allows any of the prospective-participant nodes to be configured as either a host node or a guest node, the prospective-participant nodes may engage in a discovery process using the node identifiers configured into the network interface cards.

For example, during the discovery process, the first-prospective-participant node 110 and the second-prospective-participant node 160 query their respective network cards for, at least, their (i) first-prospective-node-link-layer-address 128 and second-prospective-node-link-layer-address 178, and (ii) first-prospective-node identifier 130 and second-prospective-node identifier 180. In querying their respective network cards, the first-prospective-participant node 110 and the second-prospective-participant node 160 may use a self-discovery utility called by the common application 150. This self-discovery utility may be a standard operating system utility.

In this second approach, the host node and guest node may be selected based on some predetermined criteria after the first-prospective-participant node 110 and the second-prospective-participant node 160 establish a point-to-point communication link, as will be described in more detail below. Such criteria may include non-comparative and comparative thresholds. The comparative thresholds, for example, may be defined by the comparison of which of the nodes has a higher value data-link-layer address, which of the nodes was previously the host node, which of the nodes is currently a host in another peer-to-peer network, and other criteria.

B. Using Host Node Settings to Generate Participant-Node-Configuration Data

Keeping with the example noted above, after designating the first-prospective-participant node 110 as a guest node and the second-prospective-participant node 160 as the host node as shown in block 410, the common application 150 uses the second-prospective-node-connection settings 184 of the now designated host node, hereinafter referred to as host node 160, as service settings to generate participant-node-configuration data 420. Using the second-prospective-node-connection settings 184 as service settings establishes the host node 160 as participant node in the peer-to-peer network.

To facilitate generating the participant-node-configuration data, the host node 160 via a network-connection-discovery process determines its second-prospective-node-connection settings 184. The common application 150 on the host node 160 may call a standard operating system utility, such as IPCFG or WINIPCFG to determine its second-prospective-node-connection settings 184.

After determining the second-prospective-node-connection settings 184, the common application 150 on host node 160 may launch a dynamic-host-configuration-protocol routine to generate at least one set of network-configuration settings for the once prospective-participant node 110, now guest node 110. These network-configuration settings may include, for example a class C IP address xxx.xxx.xxx.xxx, and a subnet mask 255.255.255.1. In some instances, the network-configuration settings for the guest node 110 may have limited leases. These leases may be limited in duration; for example, the lease may only last for a period of time, such as 4 hours, or for so many bytes of data transferred.

After generating one or more network-configuration settings for the guest node 110, the host node 160 may store these settings in a record in a database file on its data storage 164. This database file, whether relational, flat or hierarchal, may be used to route information between participant nodes in the peer-to-peer network, since the network-connection setting for the all the participants in the peer-to-peer network will be contained in the database. Accordingly, this database file may be included in the participant-node-configuration data in lieu of the network-configuration settings for each of the guest node 110. In an exemplary embodiment, each of the records in the database files may be indexed by the data-link-layer addresses of the participant nodes. Thus, for a prospective-participant or guest node 110, the database file is not complete until the data-link-layer address of the guest node 110 is known by the host node. The host node may discover the data-link-layer address of the guest node 110 by establishing a point-to-point communication link with the guest node 110 as shown in block 430.

C. Discovering the Data-Link-Layer Address of the Guest Node

This function may be accomplished by establishing a point-to-point communication link between host node and the guest node as shown in block 430. Referring back to FIG. 3, before initiating the discovery process to determine the data-link-layer address of the guest node 110, the user of the host node 160 may place a check in the advertise-network-identifier box 322, the enable-encryption box 324 and may choose which network-identifier from network-identifier-selection box 330 to use. As will be described in more detail below, each of these settings effect establishing the point-to-point communication link.

This discovery-process includes establishing a data-link-layer connection between the host node 160 and the guest node 110. In accordance with the IEEE 802.11 protocol, in ad-hoc mode, the guest node 110 may establish data-link-layer connectivity with the host node 170 by detecting the presence of the ad hoc network and then initiating registration with the host node.

Registering with the host, in the simplest form, may include merely "associating" with the host node 170. Registering may also include employing secure connection services such as IEEE 802.11 Wired Equivalency Privacy (WEP), security system identifier (SSID), extensible authentication protocol (EAP) or other secure connection service.

The process of associating host node 160 with the guest node 110 may include one or more steps. Although described in more detail in the IEEE 802.11 protocol, an example of associating the host node 160 with the guest node 110 is illustrated with the following three steps. First, if advertise-network-identifier box 322 is checked, the host node 160 using an advertising function, broadcasts, multicasts or unicasts over one or more wireless channels on a wireless medium to the guest node 110 the network identifier, i.e., the SSID of the ad hoc network, defined in network-identifier-selection box 330.

The network identifier defined in network-identifier-selection box 330 allows the host node to advertise the existence of the network so that the guest node can detect the presence of the peer-to-peer network. Alternatively, if no network identifier is defined in the network-identifier-selection box 330, then the network identifier may be arbitrarily selected. As above, the network identifier threads each of the participant nodes to the peer-to-peer network.

If, for example the enable-encryption box 324 is checked, secure and/or "secret" peer-to-peer communication may be desired, and the establishing the point-to-point communication link may be preformed using secure connection system mechanisms. These secure connection system mechanisms may be in accord with one or more secure connection protocols, such as such as secure socket layer (SSL), security system identifier (SSID), extensible authentication protocol (EAP) for wired networks or wired-equivalent privacy (WEP).

When advertising the network identifier and other data-link-layer parameters, the host node 160 may encrypt this information before advertising it to the guest node using one key of a shared-key encryption mechanism provided by the secure connection system mechanisms. With the other key of the share-key encryption mechanism provisioned into the guest node 110, only the guest node 110 may detect the advertised information. Alternatively, the host node 160 may advertise the network identifier and other data-link-layer parameters to the prospective-participant node unencrypted. After detecting the network identifier and other data-link-layer parameters, the host node 160, provisioned with keys of a shared key security mechanism, sends an acknowledgement and one key of the shared key encryption mechanism to the guest node 110. The guest node 110 then uses this key in completing the negotiation of the data-link-layer connection with the host node 160.

In the second step, the guest node 110 senses the wireless medium, and if the medium is free (i.e. no other node currently transmitting), then the guest node 110 transmits a request for synchronization information from the host node 160. If, however, the wireless medium is busy, the guest node 110 delays transmission for a period of time before re-requesting the synchronization information. Once the synchronization information is received, the guest node 110 adjusts as needed, and then synchronizes with the host node 160.

Third, after the guest node 110 receives the synchronization information and synchronizes with host node 160, the guest node 110 and host node 160 exchange frames, or packet-data, containing their respective identities or addresses, namely the first-prospective-node-link-layer-address 128 and the second-prospective-node-link-layer-address 178. The exchange of frames may eventually result in the mutual verification of identity. Once mutual verification of identity is established, the host node 160 and guest node 110 are capable of transmitting and receiving participant-node-configuration data and other data-link-layer communications over the data-link-layer connection.

D. Communicating Participant-Node Configuration Data

The function of communicating participant-node-configuration data as shown in block 440 is analogous to the communicating participant-node-configuration data function shown in block 230 of FIG. 2. The process of establishing network access may be carried out over the point-to-point communication link and may be distributed between the guest node 110 and the host node 160. The guest node 110 sends a request for network access over the point-to-point communication link, which in an exemplary embodiment, is sent over the data-link-layer connection. Included in this request is the first-prospective-participant-node identifier 130 with which the host node 160 determines if any network services are available to the guest node 110.

The host node 160 may determine if any network services are available to the guest node 110 in various ways. For instance, host node 160, via its user interface 170, may display to the user of host node 160 an indication that contains the node identifier of the guest node 110. Such indication may be posed in a pop-up dialog window in which an indication carrying a query, stating for example, "This is John's Computer, may I join your network?"

Using a keystroke, combination of keystrokes, mouse commands or other input, the user of the host node 160 acknowledges that network services are or are not available to the guest node 110. Alternatively, the host node 160 may accept all requests for network access, accept only request from specific computers, and/or accept requests based on some other decision mechanisms.

After determining that network services are available, the host node 160 may acknowledge that the network services are available by sending the participant-node-configuration data over the point-to-point communication link to the guest node 110. If, on the other hand, no network services are available, the host node 160 may send to the guest node 110 over the point-to-point communication link an acknowledgement that indicates denial of network access.

While listening for a response to its request for network access, the guest node 110 may receive over the point-to-point connection the acknowledgment with the participant-node-configuration data or the indication denying network access. After receiving the participant-node-configuration data, the guest node may 110 then configure itself as a participant node on the peer-to-peer network as shown in block 450.

E. Configuring the Guest Node as a Participant Node

Similar to the function of configuring the prospective-participant node 110 as a participant node shown in block 240 of FIG. 2, the function of configuring the guest node 110 as a participant node as shown in block 450 may be carried by the common application 150 when executed by the processors 112 and 162. As noted, the guest node 110 may configure itself using the participant-node configuration data to become a participant node.

When configuring itself, the guest node 110 extracts the network-configuration settings for the guest node from the participant-node-configuration data, which may include one or more records of network-connections settings. Using the network-configuration settings for the guest node, the guest node 110 then configures its configurable prospective-node-connection settings 134.

For example, the guest node 110 sets its IP address to the class C IP address xxx.xxx.xxx.xxx, and subnet mask value to 255.255.255.1. Once the guest node 110 configures its configurable prospective-node-connection settings 134 with the settings from the participant-node-configuration data, the network connection settings of the guest node 110 are the settings for a participant node of the peer-to-peer network. With setting the guest node's network-connection settings and with the other records in the participant-node-configuration data, the guest node 110 (now a participant node in the peer-to-peer network) can engage in peer-to-peer communications with the host node 160 and any other participant nodes in the peer-to-peer network.

4. Interfacing with the Common Application

Figure 5:
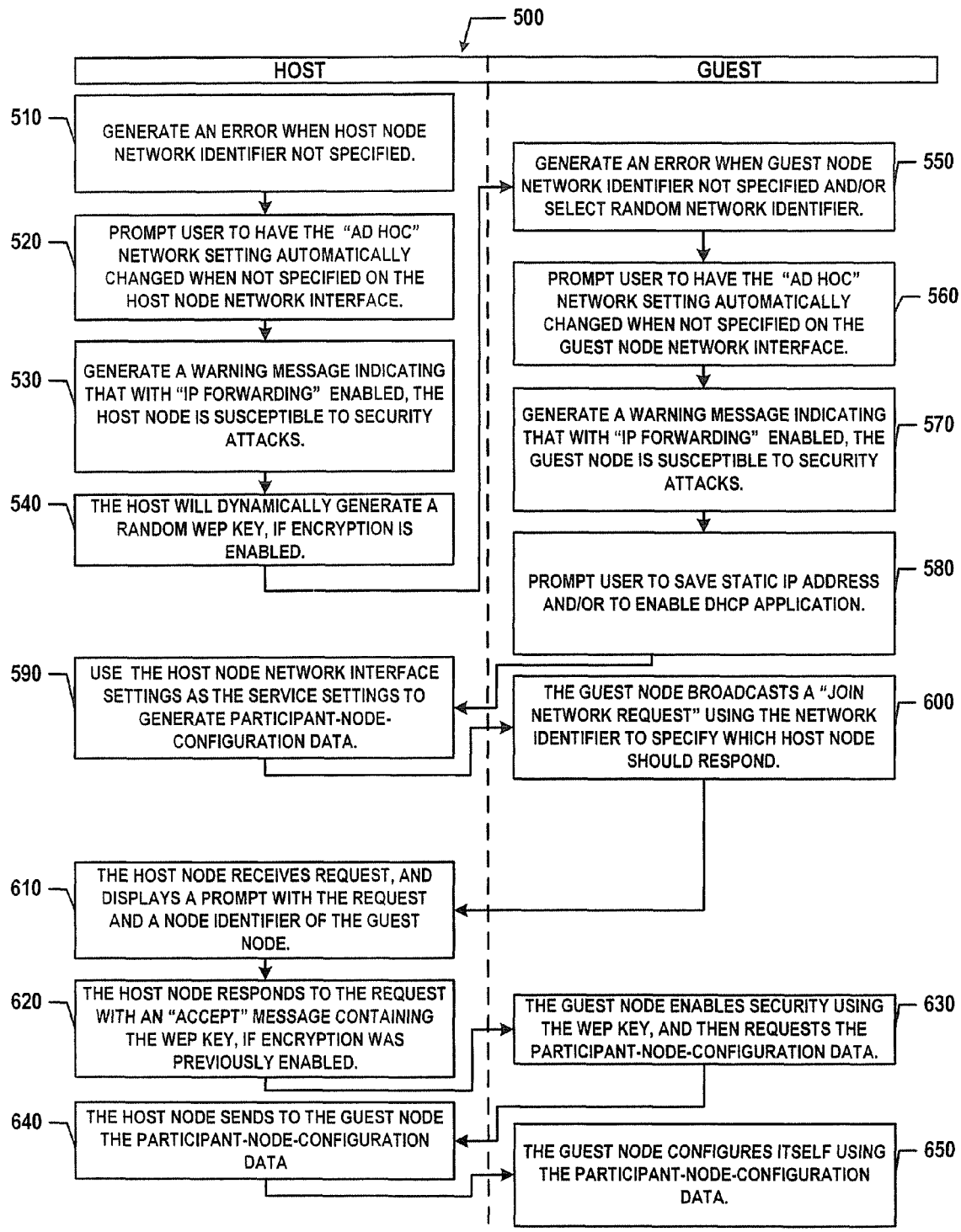
FIG. 5 is a flow chart 500 illustrating the functions used to accomplish interfacing with the common application in accordance with one of the exemplary embodiments.

FIG. 5 is a flow chart 500 illustrating interfacing with the common application 150 in accordance with an exemplary embodiment. In use, the common application 150 performs the following steps, some of which are performed on the host node 160 and some of which are performed on the guest node 110. At block 510, the common application 150 on the host node 160 determines if the network identifier on the host node 160 is selected. If the host node 160 determines that no network identifier is specified, it generates an error, which may require the user to select to select a network identifier or one will be arbitrarily selected.

At block 520, the common application 150 determines if the network interface card of the host node 160 is set to peer-to-peer communication mode. If not, the common application 150 generates an error, and then requests the user to acknowledge that the mode of network interface card will be changed automatically to peer-to-peer communication mode.

At block 530, the common application determines if "IP Forwarding" on the host node 160 is enabled. If enabled, the common application will then generate and display on the user interface 170 of the host node 160 a warning message indicating that when forwarding the IP address of the host node 160 is enabled, the host node 160 is vulnerable to attacks on its security. At block 540, if the enable encryption box 324 is selected, the host node 160 dynamically generates a random WEP key.

At block 550, the common application 150 on the guest node 110 will generate and display an error on the user interface 120 of the guest node 110. This error may require the user to select to select a network identifier or one will be arbitrarily selected. At block 560, the common application 150 determines if the network interface card of the guest node 110 is set to peer-to-peer communication mode. If not, the common application 150 generates an error, and then requests the user to acknowledge that the mode of network interface card will be changed automatically to peer-to-peer communication mode.

At block 570, the common application 150 determines if "IP Forwarding" is enabled on the guest node 110. If enabled, tire common application will then generate and display on the user interface 120 of the guest node 110 a warning message indicating that when forwarding the IP address of the guest node is enabled and that it is vulnerable to attacks on its security.

At block 580, the common application 150 on the guest node 110 will determine if dynamic-host-configuration-protocol setting is enabled, and if not, the user will be prompted to have the static IP address and other network-connections settings saved to the data storage for later reset, if needed. After the static IP address and other network connection settings are saved, the user is prompted to change the dynamic-host-configuration-protocol setting to enabled. Alternatively, the common application 150 may save the IP address and other network-connections settings and change the dynamic-host-configuration-protocol setting automatically, i.e., without user intervention.

At block 590, the host node 160 will initialize a dynamic-host-configuration-protocol routine or application using the network-connection settings of the host node 160 as service settings. Accordingly, the host node 160 will generate participant-node-configuration data. At block 600, the common application 150 on the guest node 110 will broadcast, multicast, or unicast a "join network request" using the network identifier so that host node 160 having the specified network identifier responds.

At block 610, the host node 160 receives the "join network request" and a pop-up dialog window prompts the user of the host node 160 to determine if any network services are available to the guest node 110. At block 620, after approval, the common application 150 on the host node 160 responds to the request with an "accept message" that contains the WEP key, if the enable encryption box 324 was selected. At block 630, after receiving the "accept message," the guest node 110 enables its security mechanisms using the WEP key. At block 640, the common application 150 on the guest node 110, using the WEP key, requests the participant-node-configuration data from the host node 160.

At block 650, responsive to the request for the participant-node-configuration data, the host node 160 sends to the guest node 110 the participant-node-configuration data. And at block 650, the guest node 110 sets its configurable network connection settings using the network connection settings extracted from the participant-node-configuration data, thus making the guest node a participant in the peer-to-peer network.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

Moreover, the claims should not be read as limited to the described embodiments, order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A method of setting up a prospective-participant node as a participant node in a peer-to-peer network to enable the prospective-participant node to engage in peer-to-peer communication in the peer-to-peer network with one or more other participant nodes, wherein each of the one or more other participant nodes is configured with a different respective Internet Protocol (IP) address defining how to address the participant node in the peer-to-peer network, the method comprising:

(a) at least one of the one or more other participant nodes using its IP address to generate participant-node-configuration data for configuring the prospective-participant node as a participant node in the peer-to-peer network, wherein the participant-node-configuration data includes an IP address (i) that is different from the IP address of the at least one of the one or more other participant nodes, and (ii) that defines how to address the prospective-participant node as a participant node in the peer-to-peer network; and (b) the at least one of the one or more other participant nodes sending to the prospective-participant node the participant-node-configuration data, wherein the IP address included in the participant-node-configuration data is usable by the prospective-participant node as an address for the one or more other participant nodes to address the prospective-participant node as a participant node in the peer-to-peer network.

2. The method of claim 1, further comprising the at least one of the one or more other participant nodes using a network-configuration-discovery process to ascertain its IP address.

3. The method of claim 1, wherein element (b) is performed in response to the at least one of the one or more other participant nodes determining that network services are available to the prospective-participant node.

4. The method of claim 1, further comprising:
  (c) establishing a point-to-point communication link between the at least one of the one or more other participant nodes and the prospective-participant node, wherein the at least one of the one or more other participant nodes sending to the prospective-participant node the participant-node-configuration data comprises the at least one of the one or more other participant nodes sending the participant-node-configuration data over the point-to-point communication link to the prospective-participant node.

5. The method of claim 4, wherein establishing a point-to-point communication link between the at least one of the one or more other participant nodes and the prospective-participant node comprises the at least one of the one or more other participant nodes engaging in a discovery process to establish a data-link-layer connection with the prospective-participant node.

6. The method of claim 4, further comprising the at least one of the one or more other participant nodes receiving a request for network access over the point-to-point communication link from the prospective-participant node.

7. The method of claim 6,
  wherein the prospective-participant node is configured with a node identifier,
  wherein the at least one of the one or more other participant nodes receiving the request for network access over the point-to-point communication link from the prospective-participant node comprises the at least one of the one or more other participant nodes receiving from the prospective-participant node a data-link-layer message containing the node identifier,
  wherein the at least one of the one or more other participant nodes uses the node identifier to determine if any network services are available to the prospective-participant node, and
  wherein element (b) is performed in response to the at least one of the one or more other participant nodes determining that network services are available to the prospective-participant node.

8. The method of claim 4, wherein elements (a), (b), and (c) of claim 4 are performed using at least one secure connection service.

\* \* \* \* \*